(12) United States Patent (10) Patent No.: US 9,191,278 B2
Schlichter et al. (45) Date of Patent: *Nov. 17, 2015

(54) SYSTEM AND METHOD FOR LOCATING OFFENDING NETWORK DEVICE AND MAINTAINING NETWORK INTEGRITY

(71) Applicant: ADTRAN, Inc., Huntsville, AL (US)

(72) Inventors: Timothy J. Schlichter, Huntsville, AL (US); David Perkinson, Madison, AL (US); Mark Rudolph, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/769,159

(22) Filed: Feb. 15, 2013

(65) Prior Publication Data

US 2013/0166708 A1 Jun. 27, 2013

Related U.S. Application Data

(63) Continuation of application No. 12/691,045, filed on Jan. 21, 2010, now Pat. No. 8,380,828.

(51) Int. Cl.
*G06F 15/177* (2006.01)
*H04L 12/24* (2006.01)
*H04L 29/06* (2006.01)

(52) U.S. Cl.
CPC ........ *H04L 41/0816* (2013.01); *H04L 63/0227* (2013.01); *H04L 63/1441* (2013.01); *H04L 41/0213* (2013.01); *Y02B 60/43* (2013.01)

(58) Field of Classification Search
CPC ............ H04L 41/0213; H04L 41/0659; H04L 41/0816
USPC ................................... 709/220–222
See application file for complete search history.

(56) References Cited

U.S. PATENT DOCUMENTS

| | | | |
|---|---|---|---|
| 2006/0174342 A1* | 8/2006 | Zaheer et al. | 726/23 |
| 2006/0212932 A1* | 9/2006 | Patrick et al. | 726/11 |
| 2007/0283045 A1* | 12/2007 | Nguyen et al. | 709/245 |
| 2009/0113043 A1* | 4/2009 | Suizo et al. | 709/224 |
| 2009/0172151 A1* | 7/2009 | Davis | 709/224 |
| 2010/0085971 A1* | 4/2010 | Schunemann | 370/392 |
| 2010/0315972 A1* | 12/2010 | Plotnik et al. | 370/254 |

* cited by examiner

*Primary Examiner* — Jason Recek
(74) *Attorney, Agent, or Firm* — Fish & Richardson P.C.

(57) ABSTRACT

A system and method detects within an IP network an offending network device that has been adversely affecting the IP network performance. A discovery protocol frame is propagated to successive network switches and is formed as a field having a query for inquiring within each network switch to which the frame is propagated whether the network switch has a database entry regarding the MAC address and switch port for the offending network device to locate the offending network device. This discovery protocol frame includes a command for any network switch that has the offending network device connected thereto to disable the switch port to which the offending network device is connected or block all data traffic from the MAC address of the offending network device.

28 Claims, 5 Drawing Sheets

LLDP ORGANIZATIONALLY-SPECIFIC TLV
THIS TLV IS DEFINED SO THAT AN ORGANIZATION CAN EXTEND LLDP TO FIT THEIR NEEDS. THE OUI (ORGANIZATIONALLY UNIQUE IDENTIFIER) IS INCLUDED SO THAT EACH ORGANIZATION CAN DIFFERENTIATE BETWEEN THEIR OWN SPECIAL TLVS AND OTHER ORGANIZATION'S TLVS. THIS SPECIAL TLV WOULD BE USED TO DEFINE THE MAC ADDRESS OF THE FAULTY DEVICE.

| TLV TYPE =127 | TLV INFORMATION STRING LENGTH | OUI | ORGANIZATIONALLY-DEFINED SUBTYPE | ORGANIZATIONALLY-DEFINED INFORMATION STRING |
|---|---|---|---|---|
| 7 BITS | 9 BITS | 3 OCTETS | 1 OCTET | 0 TO 507 OCTETS |

*FIG. 4A*

MAC ADDRESS TLV

| TLV TYPE =127 | TLV INFORMATION STRING LENGTH | OUI 0x00 0xA0 0xC8 | TLV SUBTYPE 0x05 | MAC ADDRESS | ACTION |
|---|---|---|---|---|---|

*FIG. 4B*

SYSTEM AND METHOD FOR LOCATING OFFENDING NETWORK DEVICE AND MAINTAINING NETWORK INTEGRITY

CROSS-REFERENCE TO RELATED APPLICATION

This application is a continuation of U.S. patent application Ser. No. 12/691,045 entitled "System and Method for Locating Offending Network Device and Maintaining Network Integrity" filed on Jan. 21, 2010, the entire contents of which is hereby incorporated by reference for all purposes.

FIELD OF THE INVENTION

This invention relates to communications systems, and more particularly, this invention relates to locating an offending network device that has been adversely affecting a communications network and maintaining network integrity.

BACKGROUND OF THE INVENTION

A common problem that occurs in a Local Area Network (LAN) or other IP networks is when one network device connected to the network adversely affects the entire network performance. The behavior of that offending network device often impacts normal network performance. Usually, it is necessary to determine where the offending network device is physically located in a building and its connection status to network switches and other network resources or network devices. This information needs to be determined quickly so action can be taken to restore the network to normal performance.

It is well known that each network device includes a universally unique identifier as its Media Access Control (MAC) address. In a network that uses a plurality of network switches, for example, layer 2 Ethernet switches, each network switch maintains a table of MAC addresses and the physical port on which that MAC address was learned. For example, a faulty network device could have a bad MAC card and transmit packets in an out-of-control manner. In another example, a server could use an IP address of x.x.x.x with its MAC information and address. A computer as a network device could previously have had that IP address of x.x.x.x. The user of that computer may not have used that computer for six months. When the offending user boots six months later, that user maintains the static IP address of x.x.x.x for their computer, which advertises itself to the network and other users as that IP address. In operation, other users (including the offending user) may be trying to access the server that has the IP address of x.x.x.x. Because traffic is redirected from that correct server to the computer of the offending user, the network does not operate properly. Again, the offending computer with the wrong IP address needs to be located quickly and efficiently. Even worse is when an offending user must be located because of malicious behavior. Then it often becomes more critical to locate the offending user quickly and efficiently.

One current solution to locate the offending network device and its MAC address is for a technician or other user to log-in manually into each network switch and determine if the offending or faulty network device is directly connected to that network switch and take any necessary actions such as shutting down the port, isolating the offending or faulty network device on a separate VLAN, rate limiting that offending or faulty network device, blocking all traffic from that located MAC address and/or similar solutions. This manual log-in technique is a lengthy, cumbersome process, especially in larger networks where there are many network switches to search. Also, a detailed knowledge of the network architecture is required, thus requiring the technician hunting for the offending network device to determine if the device is directly connected to the network switch or if the MAC address was learned on a switchport that is tied to another network switch. For example, the faulty or offending network device could be located multiple hops away.

SUMMARY OF THE INVENTION

A system and method detects within an Internet protocol (IP) network an offending network device that has been adversely affecting the IP network performance. In one aspect, a discovery protocol frame is propagated to successive network switches within the IP network and is formed as a field having a query for inquiring within each network switch to which the frame is propagated whether the network switch has a database entry regarding the Media Access Control (MAC) address and switch port for the offending network device to locate the offending network device. This discovery protocol frame includes a command for any network switch that has the offending network device connected thereto to disable the switch port to which the offending network device is connected or block all data traffic from the MAC address of the offending network device. When the offending network device location is found, the switch port to which the offending network device is connected is disabled or all data traffic from the MAC address of the offending network is blocked.

In one aspect, the discovery protocol is formed as a one-way neighbor discovery protocol such as a Link Layer Discovery Protocol (LLDP). If the network switch has a database entry and the MAC address was learned on a switch port where there is not an LLDP neighboring switch, the location of the offending network device has been determined.

In yet another aspect, a Management Information Base (MIB) is accessed at each network switch using the Simple Network Management Protocol (SNMP). In one aspect, the discovery protocol frame is formed as a user-defined field as a command that indicates information should be given by a network switch concerning any knowledge about stored MAC addresses. In one aspect, the network switches are formed as Ethernet switches or routers, and in another aspect, at least one is formed as a Local Area Network (LAN) access point.

In yet another aspect, the discovery protocol frame is propagated from an administrator or other module as a network management station. This discovery protocol frame in one example includes an organizationally specific Type Length Value (TLV) and Organizationally Unique Identifier (OUI) and defined information string to define a MAC address for the offending network device and define the query.

A communications system is also set forth in detail.

BRIEF DESCRIPTION OF THE DRAWINGS

Other objects, features and advantages will become apparent from the detailed description which follows when considered in light of the accompanying drawings in which:

FIG. 4A is a diagram showing an example frame format for an Link Layer Discovery Protocol (LLDP) organizationally specific TLV that can be modified and used in accordance with a non-limiting example.

FIG. 4B is a diagram showing an example frame format for a MAC address TLV that can be modified and used in accordance with a non-limiting example.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

Figure 1:
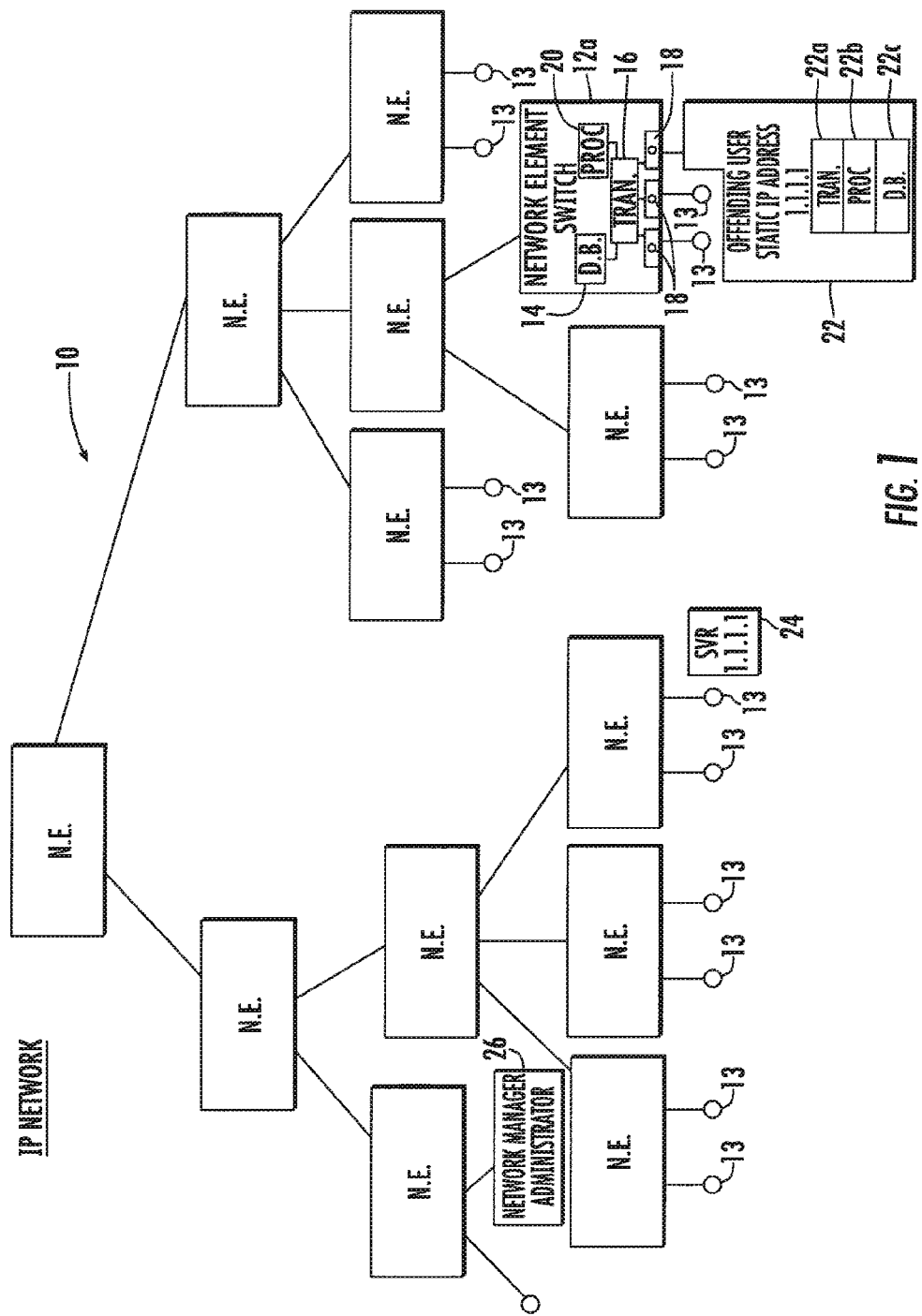
FIG. 1 is a high-level block diagram of a communications system showing a plurality of network elements as network switches forming a communications network and an offending network device as a user computer having a static IP address and a server that uses the same IP address, wherein the system and method, in accordance with a non-limiting example, locates the offending network device and disables the switch port or blocks all data traffic the MAC address of the offending network device to maintain network integrity.

In accordance with a non-limiting example, the system and method detects an offending network device within an IP network such as the illustrated communications system shown in FIG. 1 at 10 that has a plurality of network elements (N.E.) 12, typically network switches and/or routers, that form a communications internet protocol (IP) network. The switches 12 include ports with various network devices 13 connected thereto, such as IP phones, computers and other devices. One network element as a switch is shown as 12a and is illustrated with components in greater detail, such as a database that includes data for a Management Information Base (MIB) or other database 14, transceiver 16, and various ports 18 and processor 20. Other components of such network switches as known to those skilled in the art are included, but not shown in detail. Each of the elements 12 typically includes such components. This network 10 includes the plurality of network elements as switches 12 in some examples, such as Ethernet switches, that are connected together to form the network. Many of the network switches 12 can be layer 2 network switches and each typically operates in conjunction with a database and Management Information Base (MIB) 14 such as illustrated with respect to the switch 12a. It should be understood that the term switch as described can broadly encompass different layer switches, routers and other devices, including wireless access points.

Different data link protocols could be used such as Ethernet for a LAN, PPP, HDLC and ADCCP. In the network diagram shown in FIG. 1, for example, a network device shown at 22 could have a bad MAC card and transmit packets in an out-of-control manner. In this particular illustrated example, a server 24 as illustrated has an IP address of x.x.x.x and the offending network device is a computer as a network device such as shown in the lower right portion of the diagram at 22, which previously had an address of x.x.x.x. In this example, the user of that offending network device 22 did not use this network device as their computer for six months. When that user boots their computer six months later, that computer maintains that static address of x.x.x.x and advertises itself as that address. Other users at other computers and network devices, perhaps even the offending user, may have been trying to access the proper server 24 having the IP address of x.x.x.x. Because traffic is redirected from the server 24 to the offending network device 22, the network does not operate correctly. The offending network device 22 could be different devices, but in this example is a computer. In this example, it includes a transceiver or modem 22a, processor 22b, and memory or database 22c as is typical for many network devices. Other components not shown could be included.

In accordance with a non-limiting example, the system and method locates the offending network device 22 within this IP network 10. In a non-limiting example, an administrator 26 in one non-limiting example issues a command to the switch connected thereto to propagate a discovery protocol frame as a modified a Link Layer Discovery Protocol (LLDP) frame. The system inputs a command on a network switch, and the switch originates the LLDP frame. This frame comprises a field having a query for inquiring within each network switch or device to which the frame is propagated whether the network switch receiving the frame has a database entry regarding the Media Access Control (MAC) address for the offending network device to locate the device. A command is included for configuring the particular network switch to which the offending network device is connected to disable the switch port to which the offending device is connected or block all data from the MAC address of that offending traffic network device. In response to locating the offending network device based on an affirmative response to the query, that network switch having the connected and offending network device is configured to disable the network port or block traffic to that offending network device. As will be explained in greater detail below, a Link Layer Discovery Protocol (LLDP) frame is modified to allow almost instantaneous hunting and location of the offending network device.

It should be understood that the discovery protocol frame is part of a discovery protocol that comprises a one-way neighbor discovery protocol such as the Link Layer Discovery Protocol (LLDP). At each network switch, a database such as a Management Information Base (MIB) can be accessed such as using the Simple Network Management Protocol (SNMP). In another example, if the network switch has a database entry and the MAC address was learned on a switch port where there is not an LLDP neighboring switch, the location of the offending network device has been determined. Typically, the query of the discovery protocol frame is a user-defined field as a command that indicates information should be given by a network switch concerning any knowledge about stored MAC addresses. Although the description relative to FIG. 1 shows typically Ethernet switches or routers, it should be understood that the network switches can comprise at least one Local Area Network (LAN) access point in a non-limiting example. The discovery protocol frame can include an organizationally specific Type Length Value (TLV) and Organizationally Unique Identifier (OUI) and defined information string to define a MAC address for the offending network device and define the query.

Figure 2:
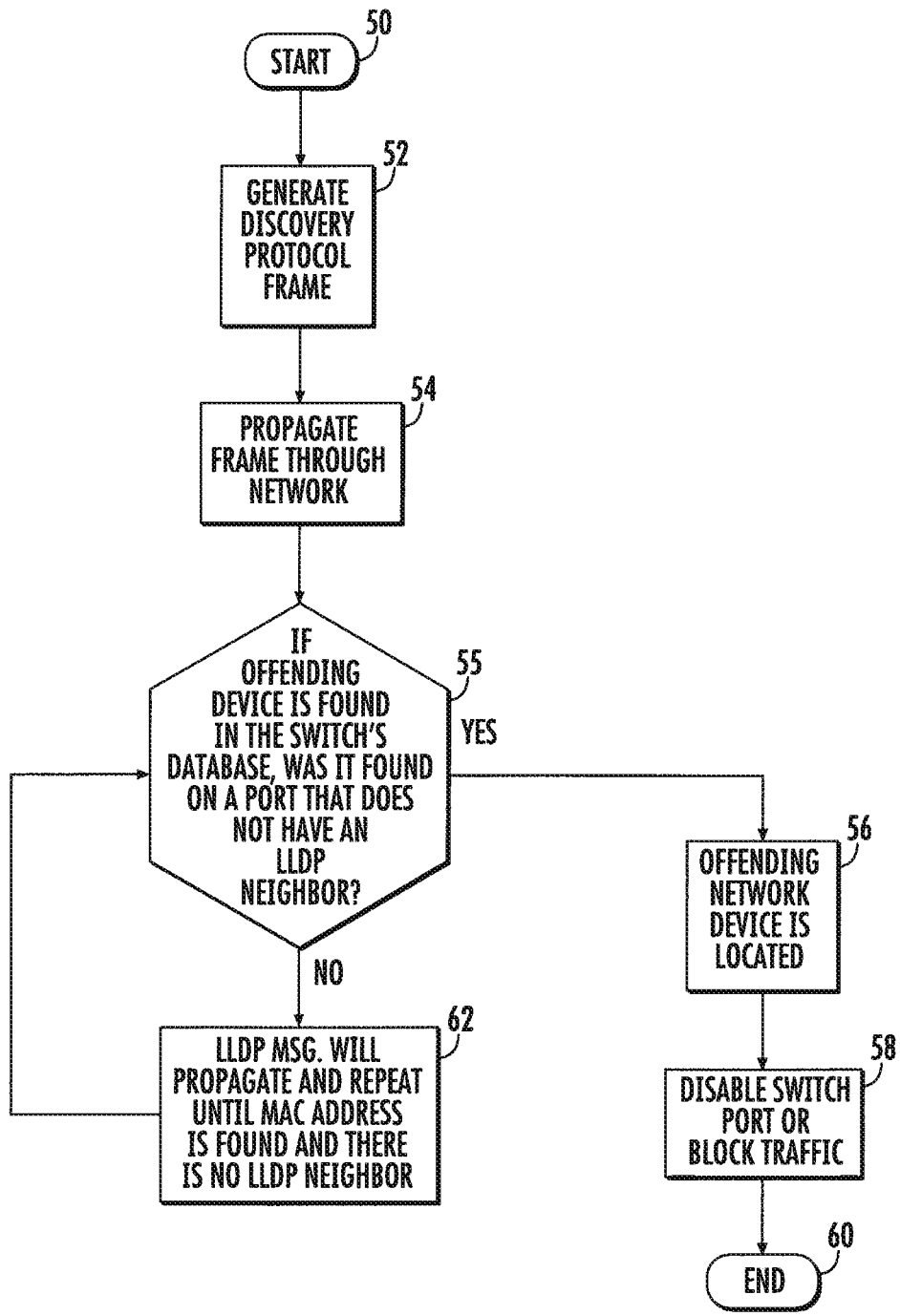
FIG. 2 is high-level flowchart of an example method that can be used in accordance with a non-limiting example for locating the offending network device and maintaining network integrity.

FIG. 2 shows a high-level flowchart of a sequence of operation for the method as described. The process starts (block 50)

and an administrator in a non-limiting example issues a command to generate a discovery protocol frame as a modified Link Layer Discovery Protocol (LLDP) frame to define the query and MAC address for the offending network device (block 52).

The administrator in this non-limiting example issues a command to the switch, which will propagate the frame throughout the network (block 54). A determination is made that if the offending device is found in the switch's database, was it found on a port that does not have an LLDP neighbor (block 55). If yes, the offending network device is located (block 56). The switch having the offending network device connected thereto disables the switch port to which the offending network device is connected or blocks all data traffic from the MAC address of the offending network device (block 58). For example this is accomplished using the discovery protocol frame that includes a command that instructs any switch having the offending network device connected thereto to disable the switch port or block all data traffic from that MAC address. The process ends as noted at block 60.

If the offending device is not found in the switch's database and/or it was not found on a port that does not have an LLDP neighbor, then the LLDP message will propagate and repeat until the MAC address is found and there is no LLDP neighbor (block 62). This process continues as shown by the loop back from block 62 to block 55.

There now follows a brief description of LLDP relative to the communications network shown in FIG. 1 and that can be applied for purposes of understanding.

LLDP is a common protocol used to exchange information between network switches. With LLDP, each network switch has visibility of its neighboring switches. Network devices, such as Ethernet devices and switches, advertise information about themselves and store information in local Management Information Base (MIB) databases and associated with network devices and accessible via the Simple Management Network Protocol (SMNP). This information can be used to build a network topology map using a Network Management Station (NMS) such as associated with an administrator 26 or other device as illustrated.

LLDP is a technique used for Ethernet network devices, including switches, routers and wireless LAN access points and other network devices to advertise information about themselves to other nodes on the network and store information they discover using the MIB in one non-limiting example. The details that are shared include the network device capabilities, identification (such as the MAC address), and device configuration. LLDP is typically a one-way neighbor discovery protocol with periodic transmissions. The LLDP frames are typically constrained to a single length. The frames contain formatted Type Length Values (TLV's), which carry information regarding a globally unique system and port identification, time-to-live information for aging purposes, optional system capabilities and optional system names and descriptions and management addresses such as IPV4 and IPV6.

LLDP in one aspect is covered by the IEEE standard, 802.1AB Link Layer Discovery Protocol (LLDP), the disclosure which is hereby incorporated by reference in its entirety. LLDP is advantageous over network-management tools such as reading bridge tables from an SNMP bridge MIB in which algorithms decide for the bridge tables and map the port-to-MAC address entries. For example, if a network uses the spanning tree protocol, the switch at the bottom of a configuration has ports of a single segment or network device and each port of a root switch contains the sum total of the network devices below it in its bridge table. Bridge tables are not always accurate. LLDP is also advantageous over fractal matching.

With LLDP, each network device on each port stores information defining itself and sends updates to a connected neighbor, which then stores the information in standard SNMP MIB's. Thus, information gathered with LLDP is stored in a network device and is queried with SNMP techniques. Typically, the topology of an LLDP-enabled network is discovered by "crawling" the hosts and querying a database. This is time consuming as noted above. "Crawling" can obtain information regarding a system name and description, port name and description, VLAN name, IP management address, system capabilities such as switching and routing, the MAC/PHY information and other link aggregation information.

In one aspect, LLDP defines a set of common advertisement messages and a protocol for transmitting the advertisements and a method for storing information contained in the received advertisements. Typically, LLDP-capable network devices support device chassis ID and port ID advertisements and support system name, system description and system capabilities advertisements. Typically, LLDP information is transmitted periodically and stored for a finite period. One recommended transmission rate is about 30 seconds, but this can be adjustable. Usually, the information stored in the SNMP MIB is valid for a period of time defined by the LLDP "time to live" (TTL) value as contained within a received packet. One recommendation is a TTL value of about 120 seconds, but it can be set to a maximum value of about 65,000 seconds or a minimum value of 0 seconds. Typically, a network device receives an LLDP advertisement packet and stores the information within it and initializes a timer that will be compared to the TTL value. If the timer reaches the TTL value, the network device deletes the stored information, and thus, ensures that only valid LLDP information is available to Network Management Systems. It should be understood that LLDP frames typically are not forwarded, but constrained to a single link and contain formatted TLV's as type length values that carry the globally unique system and port identification, time-to-live information for aging purposes, optional system capabilities such as the router, IP phone, and wireless AP and optional system name and description, management addresses and organizational extensions.

Typically, each LLDP-enabled network device contains one or several LLDP agents such as an LLDP state machine that controls the transmission and receipt of frames and state machine control variables. The local MIB holds the locally configured data that could be supplied or modified by management applications of a management system. Remote MIB's hold and age data as received.

Usually the LLDP frame contains an LLDP multicast address that is about six bytes as a destination address and a MAC address of about six bytes and an LLDP ether type of about two bytes and the LLDPU that is data plus padding and the FCS. An LLDPU field contains the TLV's as a chassis ID, port ID, TTL and similar information.

As noted before, in operation, a Link Layer Discovery Protocol (LLDP) frame is modified to allow almost instantaneous hunting and location of the offending network device. As illustrated, a query message is sent using LLDP, originating from user input on one network switch that propagates to all switches in the network. This query asks if the network switch has an entry in its database table for the offending network device having the MAC address. If it has an entry and the MAC address was learned on a port where there is not an LLDP neighboring network switch, the device location has been determined. The network switch can be configured to take action automatically based on finding the location of the offending network device. The port can be automatically disabled or a rule can be automatically added to the network switch to block all traffic from the offending or fault network device's MAC address. In other cases, traffic from the MAC address corresponding to the offending network device is prevented from accessing the network. This solution can be executed in seconds with minimal user intervention as compared to hunting the offending network device by manually logging onto each network switch and working through the network sequentially by logging into each switch.

In a preferred aspect, a user-defined field is added into the LLDP frame. This user-defined field is a command that indicates that information should be given by a network switch concerning knowledge about stored MAC addresses. The query is sent to each network switch and device and requests whether information is known about a particular MAC address. Information is sent back. The query propagates through the network and the modified frame includes a command to shut down the offending network device, for example, by shutting down the port.

Figure 3A:
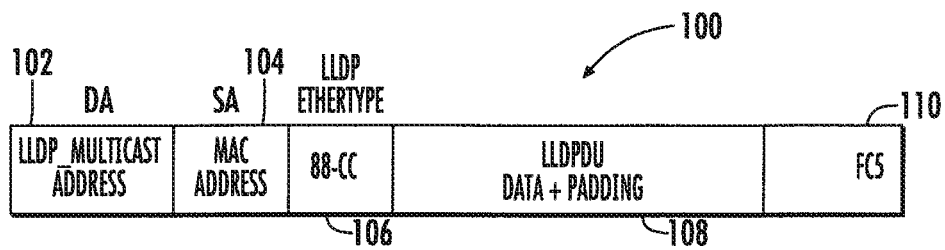
FIGS. 3A through 3C show respectively a Link Layer Discovery Protocol (LLDP) frame format, an LLDPU frame format and TLV format that can be modified and used in accordance with non-limiting examples.

FIG. 3A shows an IEEE 802.3 LLDP frame 100 that includes an LLDP multicast address 102 such as six bytes (octets) as a destination address and a MAC address 104 of about six bytes (octets) and an LLDP ethertype 106 of about two bytes (octets) and the LLDPDU 108 (Link Layer Discovery Protocol Data Unit) that is data plus padding and typically is about 1500 bytes (octets) and the FCS 110 as the frame control sequence of about four bytes (octets). The LLDPU field typically contains the TLV's as a chassis ID, port ID, TTL and similar items. In one non-limiting aspect, it is possible that the LLDP multicast address 102 equals 01-80-C2-00-00-0E that is the same as the STP except for the last octet. The information fields in each frame are contained in the LLDPU as the protocol data unit as a sequence of short, variable length, information elements known as TLV's that include the type, length and value fields and is modified for use with the system and method as described. The type identifies typically what kind of information is being sent. The length indicates the length of the information string in octets and the value is the actual information that needs to be sent.

Figure 3B:
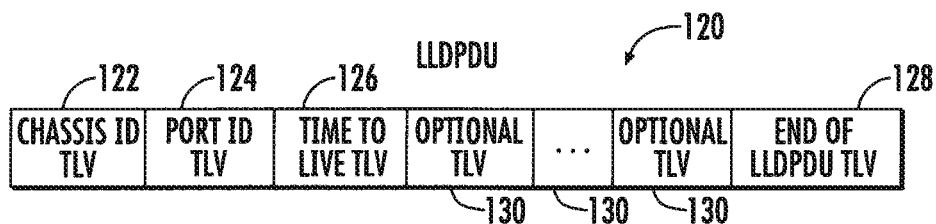

The LLDPU 120 format is shown in one non-limiting example in FIG. 3B. Mandatory TLV's that are required are illustrated. Mandatory TLV's include a chassis ID TLV 122, a port ID TLV 124, a time to live TLV 126, and an end of LLDPDU TLV 128. The optional TLV's 130 are illustrated.

Figure 3C:
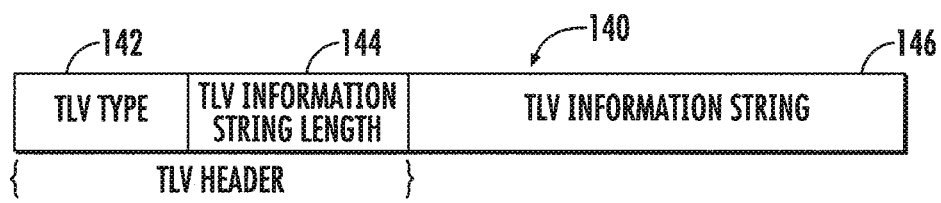

A frame for TLV format 140 is shown in FIG. 3C and shows the TLV type 142 of about seven (7) bits and the TLV information string length 144 of about nine (9) bits and the TLV information string 146 that is typically 0≤n≤511 bytes (octets). The TLV type 142 and TLV information 144 form a TLV header 148. The chassis and port ID TLV's 122, 124 represent the connected system's chassis identification and the identification of the specific port that transmitted the LLDP frame. The receiving LLDP agent combines the chassis ID and port ID to represent an entity that sent the LLDPU. The time to live (TLV) represents for how long information contained in the received LLDPU should be valid. The end-of-LLDPU TLV marks the end of an LLDPDU. The TLV type field occupies the seven most significant bits of the first octet of the TLV format. The least significant bit in the first octet of the TLV format is the most significant bit of the TLV information string length field. Typically, the TLV type field identifies a specific TLV from the LLDP basic management set or particular set of TLV's.

Typically, an LLDP agent can advertise different TLV's. There could be a port description, system name, system description, system capabilities and management address TLV. A port description TLV identifies the port in which the LLDP agent transmitted the frame and the system name TLV represents the system's administratively assigned name. It describes a textural description of a network entity.

An example format for the modified frame is shown in FIGS. 4A and 4B. As noted before, the LLDP frame as known typically contains an LLDP multicast address, destination address, MAC address, LLDP ether type, LLDPU with data and padding and the FCS. The modified frame includes the query command in a new user defined field as a command that propagates through the network and sent to each network device as necessary to request information about a MAC address and shut that MAC address down if located.

There now follows greater details regarding organizationally specific TLV extensions. These extensions can be defined by different organizations or vendors and concern implemented functionality within the network forming the communications system. The TLV structure of LLDP allows a flexible protocol and permits advanced discovery options to be created. Vendors and companies and other organizations can define TLV's that advertise information to remote entities attached to the same media that typically is a one-way advertisement and usually independent from information from a remote port. Usually, the organizationally defined extension for the TLV set includes associated LLDP MIB extensions and associated TLV selection management variables and MIB/TLV cross-reference tables. The TLV type value of 127 as shown in FIG. 4A is used for organizationally defined TLV's. IEEE 802.1 TLV extensions can have different attributes with a Virtual Local Area Network (VLAN) such as a port VLAN ID TLV, port and protocol VLAN ID TLV, VLAN name TLV, and protocol identity TLV. The protVLAN ID TLV allows a bridge port to advertise the port's VLAN identifier (PVID) that is associated with untagged or priority tagged frames. The port and protocol VLAN ID TLV allows a bridge to advertise whether it supports protocol VLAN's and what the protocols are associated. The VLAN name TLV allows a bridge to advertise the textural name of any VLAN with which it is configured. The protocol identity TLV allows a bridge to advertise particular protocols accessible through its port.

An 802.3 LAN interface can have TLV extensions such as the MAC/PHY configuration/status TLV and power via MDI TLV and length aggregation TLV and maximum frame size TLV. The MAC/PHY configuration/status TLV advertises a bit-rate and duplex capability of a node and current duplex and bit-rating of a sending node. It can advertise whether the settings were the result of auto-negotiation during link initiation or manual override. The power via MDI TLV advertises power-via-MDI capabilities. The length-aggregation TLV advertises whether the link is capable of being aggregated and whether it is currently in an aggregation, and if it is, the port of the aggregation. The maximum frame size TLV advertises the maximum supported 802.3 frame size of a sending port or station.

In accordance with a non-limiting example, an organizationally-specific TLV is used, filling in the OUI (0x00 0xA0 0xCA) then populating the defined information string with the MAC address and action. An example is a frame that is sent from one network switch and meant to be propagated to all other switches via LLDP. The "action" may be for the receiving switch to block all traffic from this MAC address. The action could also be to reply to the originating network switch with information about the MAC address, i.e., what port it is connected to.

FIG. 4A shows there is an LLDP organizationally-specific TLV that is defined so that an organization can extend the LLDP to fit their needs. The OUI (organizationally unique identifier) is included so that each organization can differentiate between their own special TLV's and the organization's TLV's. This special TLV is used to define the MAC address of the faulty device.

As shown in FIG. 4A, the TLV type equals 127 and is about seven bits in this example. The TLV information string length is about nine bits. The OUI is about three octets and the organizationally-defined subtype is about one octet. The organizationally-defined information string is about zero to about 507 octets. FIG. 4B shows a frame example for the MAC address TLV relative to the LLDP organizationally-specific TLV. The last grouping shows the action and can include additional information.

Figure 5:
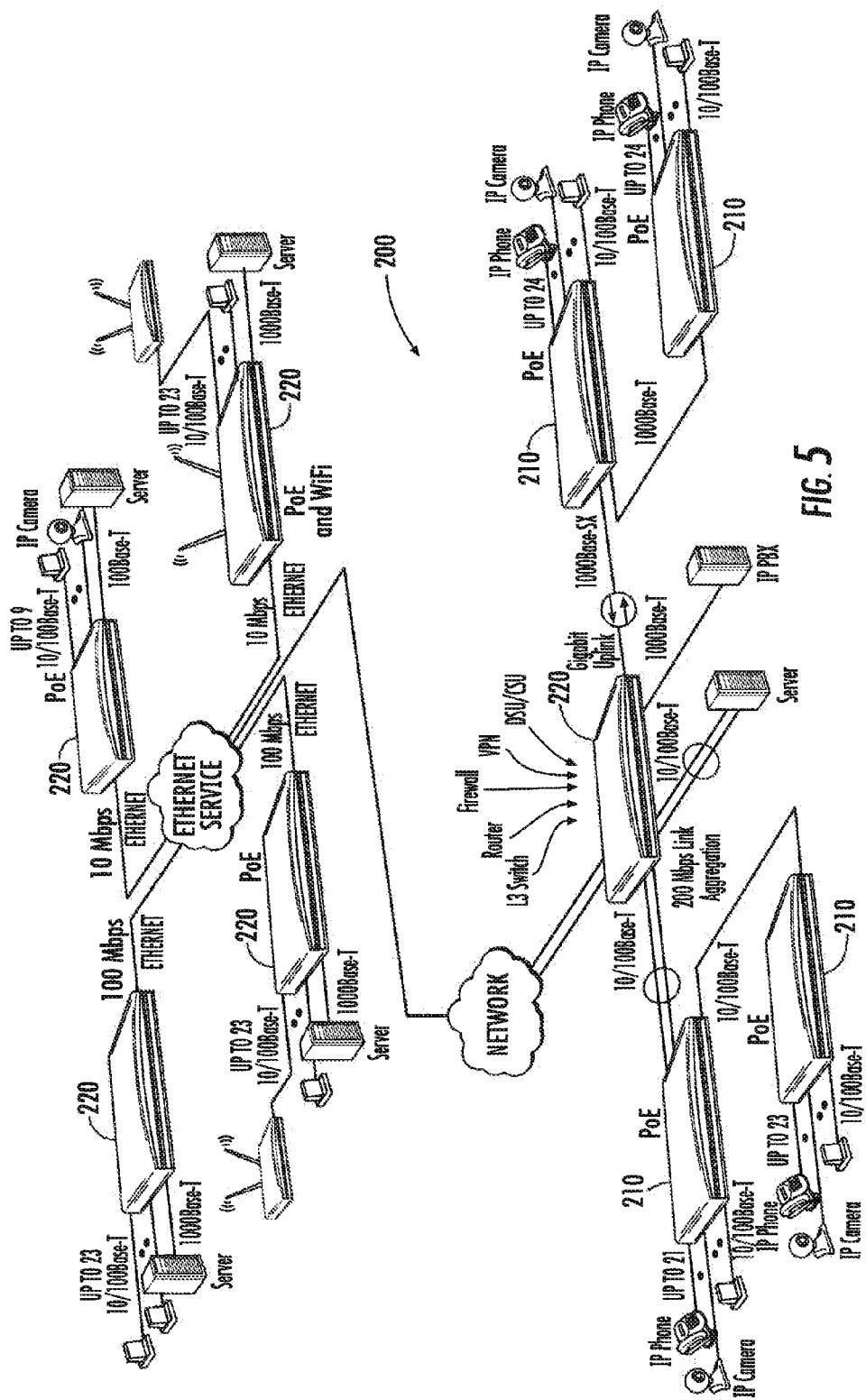
FIG. 5 is an example of a communications system that uses the method as described and incorporates various components shown in FIG. 1 and methodology and uses the modified frame formats as shown in FIGS. 3A-3C and 4A and 4B in accordance with a non-limiting example for locating an offending network device and maintaining network integrity.

There now follows a general description of a larger IP network as a general description to show a more specific and larger network example to which the examples as described can be applied. FIG. 5 is a system diagram of a communications system 200 that includes various network components and devices as shown in FIG. 1 and other interconnected platforms, switches and servers. It should be understood that the system 200 shown in FIG. 5 is only one non-limiting example of a communications system that can be used with the methodology as described.

FIG. 5 shows the communications system that includes layer 2 and layer 3 network switching functionality. Typically, layer 2 switches can be provided such as the NetVanta 1200 and 1500 series switches 210 while layer 3 Ethernet switches can be provided, such as NetVanta 1300 series devices 220 as non-limiting examples, for example, the NetVanta 1335 and related series of devices. In FIG. 4, various devices such as a 1300 series devices by ADTRAN, INC. are illustrated and 1200 series devices by ADTRAN, INC. as layer 2 devices all show layer 2 and layer 3 switching and functionality in this non-limiting example.

Switches and other network devices as illustrated in an example run the ADTRAN Operating System (AOS) and provide standards-based, non-blocking switching and support for virtual LAN's (VLAN's), Quality of Service (QOS), and Class of Service (COS) for applications such as VoIP, link aggregation, advanced management and remote configuration capability and other functions. The devices in some aspects are fully managed layer 2 and layer 3 fast Ethernet switches and include 802.3af Power over Ethernet (POE) enabled capabilities in some examples. The quality of service capabilities support mission critical applications such as VoIP. A WiFi access controller manages a plurality of Wireless Access Points (WAP's) in another example. These Ethernet switches can support layer 2, 802.1p Class of Service (COS) and weighted round robin and strict priority queuing for traffic prioritization. At layer 3, a multi-service router supports various markings and class-based weighted fair or low latency queuing.

As noted before, layer 2 switches can be stackable PoE switches with gigabit uplinks. In one non-limiting example, a Wireless Access Point (WAP) uses a NetVanta 150 wireless access point (WAP) or NetVanta 1335 with WiFi that provides 802.11 a/b/g radio support and Virtual Access Points (VAP's) and segment wireless networks together. All-in-one switch-routers perform services such as switching, IP routing, firewall, Virtual Private Networking (VPN), and 802.11 a/b/g WiFi in a single platform. A NetVanta 1335 series switch integrates a modular IP access router and 24-port PoE layer 3 switch, firewall, VP and appliance and wireless access in a platform. Layer 2 switch-routers can be all-in-one access platforms such as the NetVanta 1200 series switch-routers for a cost-effective, single box approach to Voice over IP (VoIP) migration. Layer 3 switching is provided in one example for VLAN trunking and VGRP for 802.1Q VLAN functionality and provide separation of broadcast domains and functional work areas.

Other communications servers could be used in the illustrated networks of FIG. 5 such as a NetVanta 7000 series servers and devices (including NetVanta 7100 devices) as manufactured by ADTRAN, INC. of Huntsville, Ala. The communication servers are an all-in-one, office-in-a-box that provides voice and data solutions, including Private Branch Exchange (PBX) functionality. SIP communications are used to various remote sites having communications servers such as IP business gateways in other examples.

Any communications servers could be formed as a single chassis and provide a LAN-to-WAN infrastructure and Quality of Service (QoS) that maintains voice quality and includes a Graphical User Interface (GUI) for network set-up and facilitate installation and system administration. In this example, a communications server allows a converged IP voice and data network with a full-function IP PBX for voice such as a NetVanta 7000 series. It includes an integrated Power Over Ethernet (POE) switch-router for data in an integrated device and a Virtual Private Network (VPN) for secure internet tunnelling. The device enables VoIP by providing the appropriate functionality that includes SIP-based telephony features, voice mail, multi-level auto-attendant, caller ID name/number, and other features for a complete VoIP network. The device includes multi-site SIP networking and SIP trunking service. Various optional modules include T1 and ADSL Network Interface Modules (NIMs). Analog (FXS, FXO) Voice Interface Modules (VIMs) are included in another example with T1, PRI voice interface modules and fiber SFP modules.

A communications server, in one example, is an integrated communications platform and includes capability of a fast Ethernet switch with Gigabit uplinks and expansion slots for the network interface modules and voice interface modules. A IP telephone system as part of the communications network 200 as illustrated could include voice mail and multi-level auto-attendant, caller ID name/number, COS, trunk groups, music-on-hold, sales-on-hold, overhead paging, and other call options, including call coverage lists, forwarding of calls to a cell phone and email notification of voice mail. Some devices can operate as an integral SIP gateway with the appropriate FXS and FXO analog interfaces to support analog phones, fax machines, modems and credit card readers. An integrated voice mail can include 3,000 or more messages on eight ports and multi-level auto-attendant that are multi-level on eight ports such as in the example of a NetVanta 7000 series device. These devices include, in one example, a full function IP access router and an integrated state inspection firewall protects against the Denial-of-Service (DOS) attempts. The devices include IP Sec VP and tunnelling with DES/3DES/AES encryption and an SIP-aware firewall, and include T.38 support and a door relay, music-on-hold (MOH) interfaces and Voice Quality Monitoring (VQM).

In one example, SIP networking is supported between multiple locations. A business can connect multiple sites and have three or four digit dialing and local call routing and survivability and on-net calls for toll bypass. Multiple SIP trunks allow a communications server to connect to other communication servers. Remote SIP trunks can be supported and connect to all endpoints at all locations such that a user can have local voice mail and auto-attendant services. A hub and spoke SIP network can be accomplished in another example.

A dedicated communications server can aggregate SIP trunks at a central location, which for qualified applications, increases the number of other communication servers that can be networked together.

The user can use an Internet Protocol (IP) phone such as an IP 700 series of telephones with different line versions and support multiple call functions. It is possible to incorporate voice mail-to-email applications and personal auto-attendant in which each phone sets up their own automatic attendant. It is also possible for the communications server to ring a series of stations and one external phone number. A communications server can include a PC-based phone manager and it is possible to incorporate an Internet Protocol (IP) soft phone to enable VoIP communications from a Windows- or Vista-based laptop or desktop PC. Through a PC-based phone manager, a user can customize phone settings.

It is also possible for a communications server to work in a multi-vendor environment and with an integrated T1-PRI trunk to consolidate separate voice lines and internet access onto a single T1 or PRI trunk. It is possible to combine the IP and analog communications and support analog trunks, analog phones, fax machines and credit card readers without the requirement for analog telephone adaptors. It is also possible to provide always-on, voice, data and high-speed data access to business resources from a remote home office using a single cable or DSL broadband connection in secure IP Sec-compliant VPN technology. A command line interface (CLI) can be used.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of communicating, comprising:
   detecting within an internet protocol (IP) network an offending network device that has been adversely affecting the IP network performance:
   receiving, by a first network switch within the IP network, a discovery protocol frame that comprises a field having a query for inquiring whether the network switch has a database entry specifying a Media Access Control (MAC) address and switch port for the offending network device to locate the offending device, said discovery protocol frame further comprising a command as a user defined field for a network switch that has the offending network device connected thereto to configure itself to disable the switch port to which the offending network device is connected or block data traffic from the MAC address of the offending network device; and
   propagating, by the first network switch and based on contents of the discovery protocol frame, the discovery protocol frame to a neighbor switch on a first switch port of the first network switch based on a determination, by the first network switch, that the neighbor switch has a database entry specifying the MAC address for the offending network device, wherein:
   in response to determining that the offending network device location has been located on a second switch port of the neighbor switch, the contents of the discovery protocol frame cause the neighbor switch to to disable the second switch port to which the offending network device is connected or block data traffic from the MAC address of the offending network device based on the contents of the discovery protocol frame.

2. The method according to claim 1, wherein the discovery protocol comprises a one-way neighbor discovery protocol.

3. The method according to claim 1, wherein the discovery protocol comprises a Link Layer Discovery Protocol (LLDP) the method further comprising:
   determining that there is not an LLDP neighbor connected to the second switch port to which the offending network device is connected, wherein:
   the neighbor switch configures itself to disable the second switch port to which the offending network device is connected in response to determining that the offending network device has been located on the second switch port and that there is not an LLDP neighbor connected to the second switch port.

4. The method according to claim 3, and further comprising if a network switch that receives the propagated discovery protocol frame has a database entry and the MAC address is identified on a switch port where there is not an LLDP neighboring switch, the location of the offending network device has been determined.

5. The method according to claim 1, and further comprising accessing at each of the first network switch and the neighbor switch a Management Information Base (MIB) using a Simple Network Management Protocol (SNMP).

6. The method according to claim 1, wherein said query of said discovery protocol frame comprises a user defined command that indicates information should be given by a network switch concerning any knowledge about stored MAC addresses.

7. The method according to claim 1, wherein said first network switch and neighbor switch each comprise Ethernet switches or routers.

8. The method according to claim 1, wherein said first network switch and neighbor switch each comprise at least one local area network (LAN) access point.

9. The method according to claim 1, and further comprising propagating the discovery protocol frame by inputting the command to the neighbor switch.

10. The method according to claim 1, and further comprising forming the discovery protocol frame to include an organizationally-specific type length value and Organizationally Unique Identifier (OUI) and defined information string to define a MAC address for the offending network device and define said query.

11. A communication system, comprising:
   a plurality of network switches interconnected together and configured to form an internet protocol (IP) communications network, the plurality of network switches including a first network switch and a neighbor switch that is connected to a first port of the network switch;
   an administrator device connected to the first switch and configured to:
   determine that an offending network device has been adversely affecting network performance; and
   input a command and a discovery protocol frame on the first network switch, wherein:
   execution of the command by the first network switch causes the first network switch to locate a switch port for the offending network device based on a database entry regarding a Media Access Control (MAC) address port for the offending network device, said discovery protocol frame comprising a command as a user defined field for a network switch that has the offending network device connected thereto to configure itself to disable its switch port to which the offending network device is connected or block all data traffic from the MAC address of the offending network device;

contents of the discovery protocol frame cause the first network switch to propagate the discovery protocol frame to the neighbor switch on the first switch port based on a determination, by the first network switch, that the neighbor switch has a data base entry specifying the MAC address for the offending network device; and in response to determining that the offending network device location has been located on a second switch port of the neighbor switch, the contents of the discovery protocol frame cause the neighbor switch configure itself to disable the second switch port to which the offending network device is connected or block data traffic from the MAC address of the offending network device based on the contents of the discovery protocol frame.

12. The system according to claim 11, wherein said discovery protocol frame comprises an organizationally-specific type length value and Organizationally Unique Identifier (OUI) and defined information string to define a MAC address for the offending network device and define said query.

13. The system according to claim 11, wherein the discovery protocol comprises a one-way neighbor discovery protocol.

14. The system according to claim 11, wherein:
the discovery protocol comprises a Link Layer Discovery Protocol (LLDP);
the contents of the LLDP cause the neighbor switch to determine whether there is an LLDP neighbor connected to the second switch port to which the offending network device is connected; and
the neighbor switch configures itself to disable the second switch port to which the offending network device is connected when the offending network device has been located on the second switch port and that there is not an LLDP neighbor connected to the second switch port.

15. The system according to claim 14, and wherein if a network switch that receives the propagated discovery protocol frame has an entry and the MAC address is identified on a switch port where there is not an LLDP neighboring switch, the location of the offending network device has been determined.

16. The system according to claim 11, wherein each of the first network switch and the neighbor switch access a Management Information Base (MIB) based on a Simple Network Management Protocol (SNMP).

17. The system according to claim 11, wherein said query of said discovery protocol frame comprises a user defined command that indicates information should be given by a network switch concerning any knowledge about stored MAC addresses.

18. The system according to claim 11, wherein said first network switch and neighbor switch each comprise Ethernet switches or routers.

19. The system according to claim 11, wherein said first network switch and neighbor switch each comprise at least one local area network (LAN) access points.

20. An apparatus, comprising:
a first network switch configured to interconnect with a plurality of network switches to form an internet protocol (IP) communications network;
the first network switch operable to:
receive, within the IP communications network, a discovery protocol frame that comprises a field having a query for inquiring whether the network switch has a database entry regarding a Media Access Control (MAC) address and switch port for an offending network device adversely affecting network performance to locate the offending device, said discovery protocol frame further comprising a command as a user defined field for the network switch that has the offending network device connected thereto to configure itself to disable the switch port to which the offending network device is connected or block data traffic from the MAC address of the offending network device; and propagate, by the first network switch and based on contents of the discovery protocol frame, the discovery protocol frame to a neighbor switch on a first switch port of the first network switch based on a determination, by the first network switch, that the neighbor switch has a database entry specifying the MAC address for the offending network device, wherein:

in response to determining that the offending network device location being located on a second switch port of the neighbor switch, the contents of the discovery protocol frame cause the neighbor switch to configure itself to disable the second switch port to which the offending network device is connected or block data traffic from the MAC address of the offending network device.

21. The apparatus according to claim 20, wherein said discovery protocol frame comprises an organizationally-specific type length value and Organizationally Unique Identifier (OUI) and defined information string to define a MAC address for the offending network device and define said query.

22. The apparatus according to claim 20, wherein the discovery protocol comprises a one-way neighbor discovery protocol.

23. The apparatus according to claim 22, wherein the discovery protocol comprises a Link Layer Discovery Protocol (LLDP);
the contents of the LLDP cause the neighbor switch to determine whether there is an LLDP neighbor connected to the second switch port to which the offending network device is connected; and
the neighbor switch configures itself to disable the second switch port to which the offending network device is connected when the offending network device has been located on the second switch port and that there is not an LLDP neighbor connected to the second switch port.

24. The apparatus according to claim 23, and wherein if the network switch that receives the propagated discovery protocol frame has an entry and the MAC address is identified on a switch port where there is not an LLDP neighboring switch, the location of the offending network device has been determined.

25. The apparatus according to claim 20, wherein each of the first network switch and the neighbor switch access a Management Information Base (MIB) based on the Simple Network Management Protocol (SNMP).

26. The apparatus according to claim 20, wherein said query of said discovery protocol frame comprises a user defined command that indicates information should be given by the network switch concerning any knowledge about stored MAC addresses.

27. The apparatus according to claim 20, wherein said first network switch comprises an Ethernet switch or router.

28. The apparatus according to claim 20, wherein said first network switch comprises at least one local area network (LAN) access point.

* * * * *